(12) United States Patent
Lundy

(10) Patent No.: US 7,363,059 B1
(45) Date of Patent: Apr. 22, 2008

(54) METHOD AND SYSTEM FOR PRESENTING A GRAPHICAL REPRESENTATION OF TELEPHONE KEYS ON A WIRELESS TERMINAL

(75) Inventor: Michael T. Lundy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 549 days.

(21) Appl. No.: 10/345,813

(22) Filed: Jan. 16, 2003

(51) Int. Cl.
*H04M 1/00* (2006.01)
*H04B 1/38* (2006.01)

(52) U.S. Cl. .................. 455/566; 455/90.3; 455/550.1; 455/575.1

(58) Field of Classification Search ................ 455/566, 455/403, 95, 575.1, 550.1, 90.3, 91, 414.1, 455/556.2, 74, 556; 379/355.01; 709/219, 709/224, 203, 208
See application file for complete search history.

(56) References Cited

U.S. PATENT DOCUMENTS

| 5,867,688 | A | * | 2/1999 | Simmon et al. ............. 709/208 |
| 6,047,196 | A | * | 4/2000 | Makela et al. ............ 455/566.1 |
| 6,193,152 | B1 | * | 2/2001 | Fernando et al. ........... 235/380 |
| 6,633,905 | B1 | * | 10/2003 | Anderson et al. ........... 709/219 |
| 6,850,226 | B2 | * | 2/2005 | Finke-Anlauff ............. 345/169 |
| 2002/0042291 | A1 | * | 4/2002 | Lahteenmaki et al. ...... 455/566 |
| 2003/0003876 | A1 | * | 1/2003 | Rumsey ....................... 455/74 |
| 2003/0012359 | A1 | * | 1/2003 | Nayhouse et al. ..... 379/355.01 |
| 2003/0073462 | A1 | * | 4/2003 | Zatloukal et al. ........... 455/558 |
| 2005/0043063 | A1 | * | 2/2005 | Dinn ......................... 455/566 |

OTHER PUBLICATIONS

Sandra Vogel, "O2 xda", www.zdnetindina.com/techzone/resources/handhelds/stories/63495.html, Aug. 6, 2002, printed Sep. 9, 2002 (3 pages).
"Announcing the New Pocket PC 2002 Phone Edition", www.microsoft.com/mobile/pocketpc/learnmore/phoneedition/default.asp, printed Sep. 9, 2002 (2 pages).
Gordon Lewis, "QuickSpins: Two of a Kind", Mobile Computing & Communications / Archive, www.mobilecomputing.com/showarchives.cgi?116:1, printed Sep. 9, 2002 (3 pages).
"3X4 Silkypad 1.2", Tucows PDA 3×4 Silkypad, www.pdacentral.com/palm/preview/48980.html, printed Sep. 9, 2002 (2 pages).
"Mike's Palm Software Page", http://mikew.org/palmsoft/, printed Sep. 9, 2002 (5 pages).
Ismail Dalgic, et al., "True Number Portability and Advanced Call Screening in a SIP-Based IP Telephony System", IEEE Communications Magazine, Jul. 1999, pp. 96-101 (6 pages).

* cited by examiner

Primary Examiner—Tony T. Nguyen

(57) ABSTRACT

A wireless terminal may present a graphical representation of telephone keys serially along at least one edge of the display screen. A user may indicate selection of one of the telephone keys. The wireless terminal may detect the selection of the one of the telephone keys and generate a signal corresponding to the one of the telephone keys selected.

19 Claims, 8 Drawing Sheets

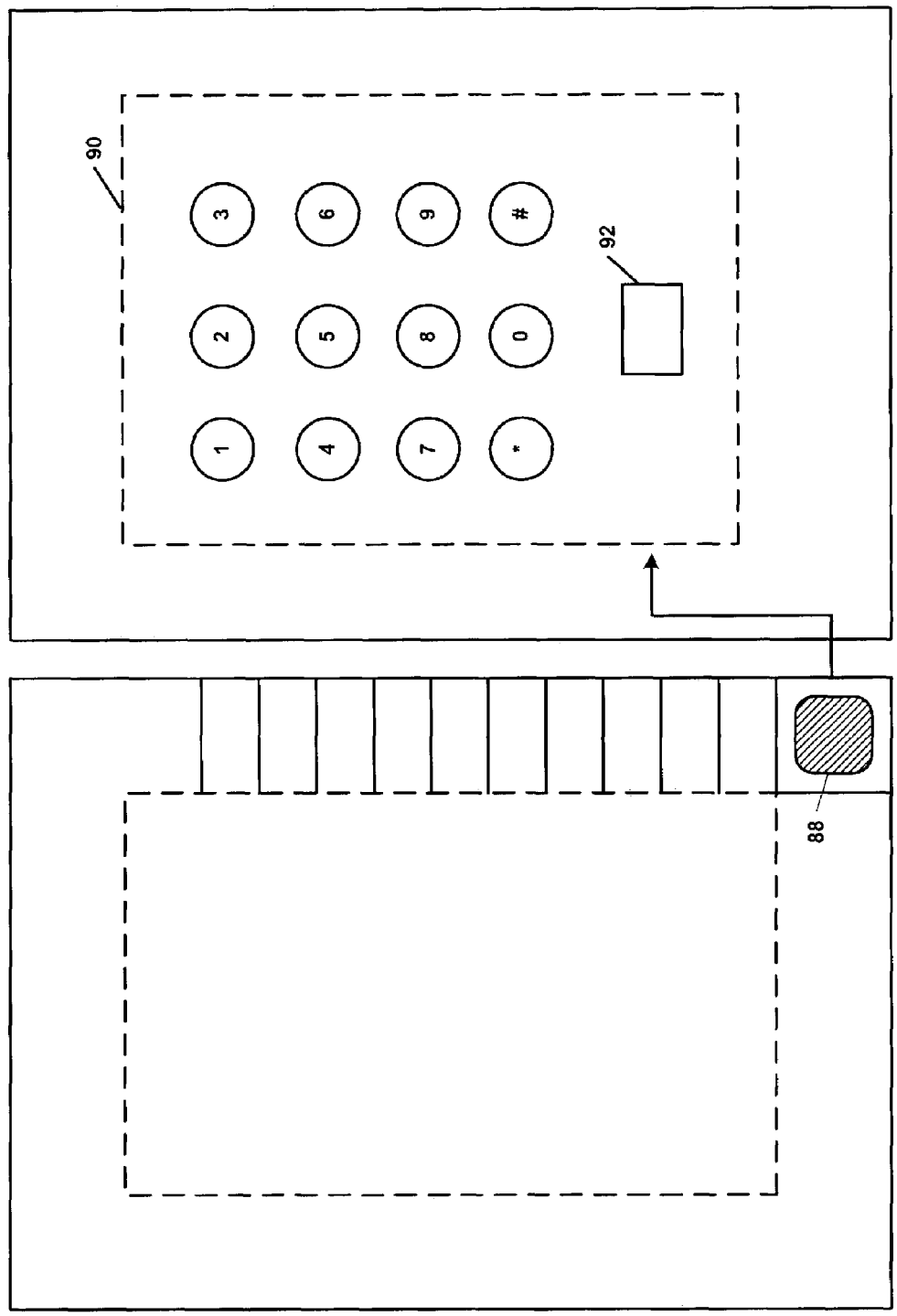

METHOD AND SYSTEM FOR PRESENTING A GRAPHICAL REPRESENTATION OF TELEPHONE KEYS ON A WIRELESS TERMINAL

BACKGROUND

1. Field of the Invention

The present invention relates to telecommunications services and more particularly to a method and system for presenting a graphical representation of telephone keys on a wireless terminal.

2. Description of Related Art

A relatively recent advance in telecommunications technology is an ability for people to wirelessly communicate with others. A wireless terminal may be, for example, a cellular phone, pager, personal digital assistant (PDA), or portable computer that an individual may carry to wirelessly communicate with others. The wireless terminal exchanges signals with a wireless network over an air interface. The wireless network, in turn, exchanges signals with a remote terminal.

The wireless terminal typically executes an application to establish and maintain a connection with the remote terminal. The application may be a dial-up application for dialing up the remote terminal. Alternatively, the application may be an e-mail application for composing, sending, and receiving e-mails with the remote terminal. Still alternatively, the application may be an instant messaging application for composing, sending, and receiving instant messages with the remote terminal.

The wireless terminal typically has a display screen. The display screen presents text and graphics associated with applications executable by the wireless terminal. Additionally, if the display screen is touch-sensitive, then the display screen may accept input from a user. For example, the wireless terminal may display a graphical icon of a telephone on the display screen. In this example, if the user touches the icon of the telephone on the display screen, then the wireless terminal will execute the dial-up application. The wireless terminal will terminate or suspend any other applications currently running on the wireless terminal. Additionally, the wireless terminal will display, over text and graphics currently on the display screen, a full-size telephone keypad. The full-size telephone keypad occupies substantially all of the display screen. The full-size telephone keypad includes numeric digits 0-9, *, and # keys, organized as four rows on the display screen, similar to that of a touchtone dialing keypad on a landline telephone.

The user can touch the keys of the full-size telephone keypad to dial the phone number of the remote terminal. Responsively, the wireless terminal will signal the wireless network to establish a connection with the remote terminal. The signal may take the form of dual-tone multi-frequency (DTMF) tones that define the phone number of the remote terminal. Alternatively, the signal may take the form of a data stream that defines the phone number of the remote terminal. The wireless network may receive the DTMF tones or the data stream, identify, from the DTMF tones or the data stream, the remote terminal, and establish the connection with the remote terminal.

The wireless terminal may terminate or suspend the dial-up application when the connection between the wireless terminal and the remote terminal is established. For example, the wireless terminal may clear the full-sized telephone keypad from the display screen. The wireless terminal will also return the user to the application being run prior to the execution of the dial-up application. The wireless terminal may display the text and graphics associated with the application being running prior to execution of the dial-up application. Therefore, the user can continue using the application at a point where he left off.

SUMMARY

The full-sized telephone keypad of the dial-up application occupies a large portion of the display screen. As a result, the full-sized telephone keypad obscures text and graphics associated with the application running prior to execution of the dial-up application.

In accordance with an aspect of the present invention, the wireless terminal may present, serially along an edge of the display screen, a graphical representation of telephone keys. The telephone keys may include the keys of the full-sized telephone keypad. By presenting the graphical representation of telephone keys serially along the edge of the display screen, the display screen can display the text and graphics associated with the application running prior to presentation of the graphical representation of telephone keys.

The user may dial up the remote terminal by indicating selection of a portion of the graphical representation presented on the display screen. The portion of the graphical representation indicated as being selected may correspond to an area defined by a telephone key. The wireless terminal may determine the telephone key corresponding to the portion of the graphical representation indicated as being selected. Additionally, the wireless terminal may output a signal corresponding to the telephone key. The signal may take the form of a DTMF tone or a data stream, that defines a number or a symbol associated with the telephone key.

The graphical representation of the telephone keys may also include a maximize key. The maximize key may be in series with the graphical representation of telephone keys, in parallel with the graphical representation of telephone keys, or along an edge different from where the graphical representation of telephone keys is presented. A user may indicate selection of the maximize key and the wireless terminal may responsively present a graphical representation of the full-sized telephone keypad on the display screen.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 7 is a full-size telephone keypad presented on the display screen as a result of a maximize key being selected.

DETAILED DESCRIPTION OF EXEMPLARY EMBODIMENTS

Figure 1:
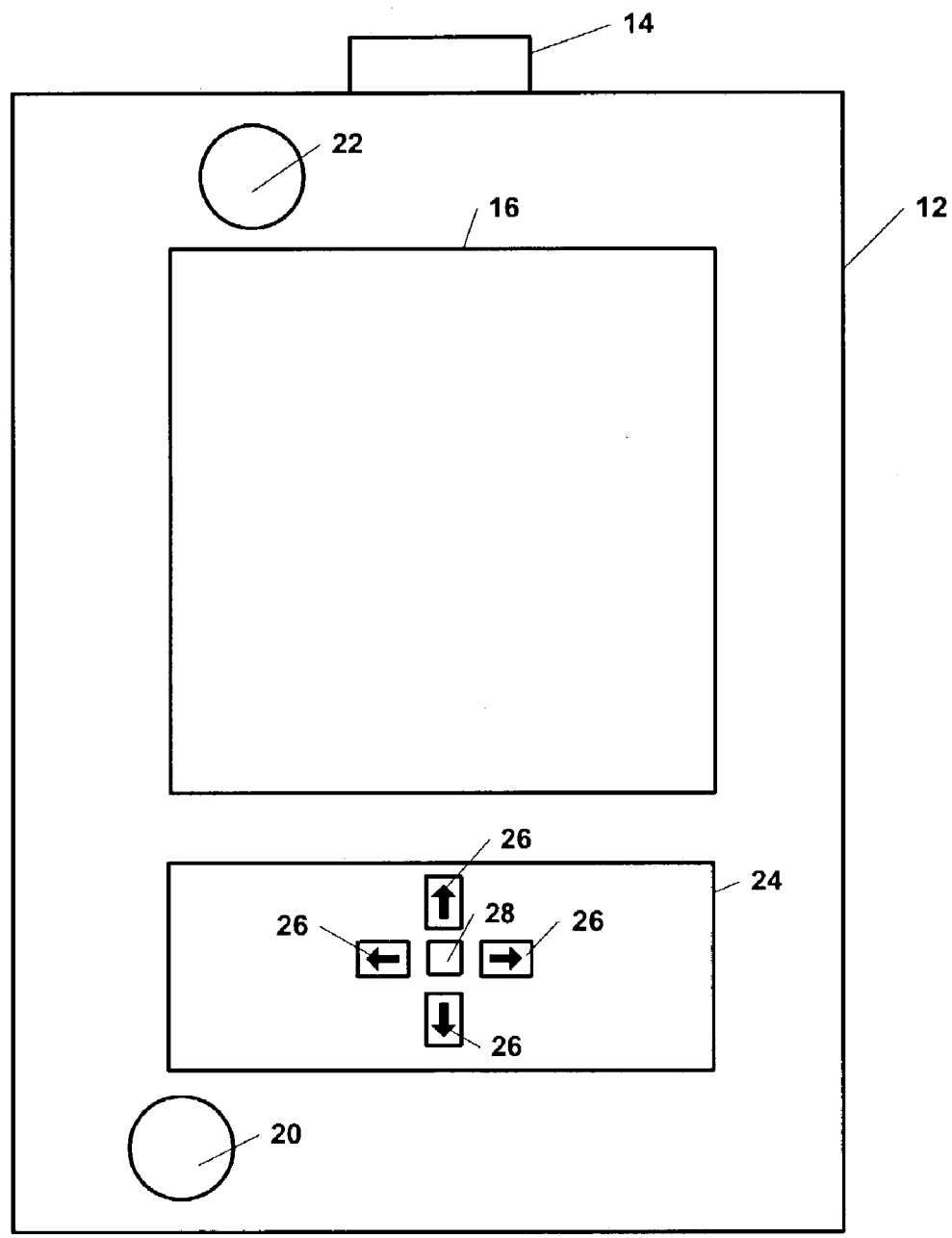
FIG. 1 is an exemplary embodiment of a wireless terminal.

FIG. 1 illustrates a wireless terminal in which exemplary embodiments of the present invention may be employed. The wireless terminal 12 may be a processor-based device, for example, a cellular telephone, a pager, a personal digital assistant (PDA), or a portable computer. Indeed, the wireless terminal may also be any number of other devices that allows for that allows for communication with a remote terminal. The wireless terminal 12 may exchange signals with a wireless network. The wireless network may, in turn, facilitate communications between the wireless terminal and a remote terminal. The remote terminal may be a landline phone, another cellular telephone, another pager, another PDA, or another portable computer, but of course other arrangements are also possible.

As described herein, the wireless terminal may perform a plurality of functions. The wireless terminal may have hardware, e.g., circuitry, that defines logic for performing the plurality of functions. Additionally or alternatively, the wireless terminal may have software, e.g., computer instructions stored in memory and executable by a processor, that defines logic for performing the plurality of functions. Provided with the present disclosure, those skilled in the art can readily design the hardware or prepare the software to perform the plurality of functions.

Referring to FIG. 1, the wireless terminal 12 may have a communication port 14, a display screen 16, a speaker 22, a microphone 20, and an input mechanism 24. The communication port may be defined by, for example, an antenna or an infrared transmitter/receiver. The communication port 14 may allow for transmitting and receiving radio frequency signals or infrared signals. Indeed, the communication port can transmit and receive a variety of other types of signals in addition to radio frequency signals or infrared signals.

The display screen 16 may present text and graphics associated with applications running on the wireless terminal. The display screen 16 may take the form of a liquid crystal display (LCD), a cathode ray tube (CRT), or some other form, that allows for display of text and graphics. The display screen 16 may be rectangular, having four edges, as shown by FIG. 1, or take some other form. For example, the display screen 16 may be shaped as a triangle, a pentagon, or even a circle. Other variations are also possible.

Additionally, the wireless terminal 12 may also have a speaker 22 and a microphone 20. The speaker 22 may play sounds such as voice received from the remote terminal. And the microphone 20 may pick up sounds such as voice to be sent to the remote terminal.

The wireless terminal 12 may also have an input mechanism 24. The input mechanism 24 may allow the user to interact with the wireless terminal 12. The input mechanism 24 may include a pointing device 26 and a button 28. The pointing device 26 may be arrow keys (as shown), a mouse, a trackball, a glide pad, or any other known input mechanism for indicating, e.g., by a pointer, a particular location within the display screen 16. On the other hand, the button 28 may be used to indicate selection of an icon or graphic, for example, defining the particular location indicated. The selection of the icon or the graphic at the particular location indicated may result in the wireless terminal 12 performing a function. The function may be to open a menu or execute an application, but other variations are also possible.

Preferably, the input mechanism may be the display screen 16, itself. The display screen 16 may be a touch sensitive LCD as found on, for example, the Casio Cassiopeia or the Toshiba 2032. Alternatively, the display screen may be a touch sensitive CRT or any other touch sensitive display. This could include a display that appears touch sensitive to the user, such as a display that responds to broken light beams, etc. A user may use touch a portion of the display screen using a stylus or his finger. The wireless terminal may detect that the portion of display screen has been touched. Responsively, the wireless terminal may perform a function in accordance with the portion of the display that has been touched.

As one skilled in the art will appreciate, the input mechanism may take other forms in addition to those described herein. The input mechanism 24 could be associated with something else other than arrow keys, a mouse, or a touch screen. Additionally, the input mechanism 24 could be a combination of those described herein. All such modifications and equivalents which fall within the spirit and scope of the exemplary embodiments of the present invention are included herein.

Figure 2:
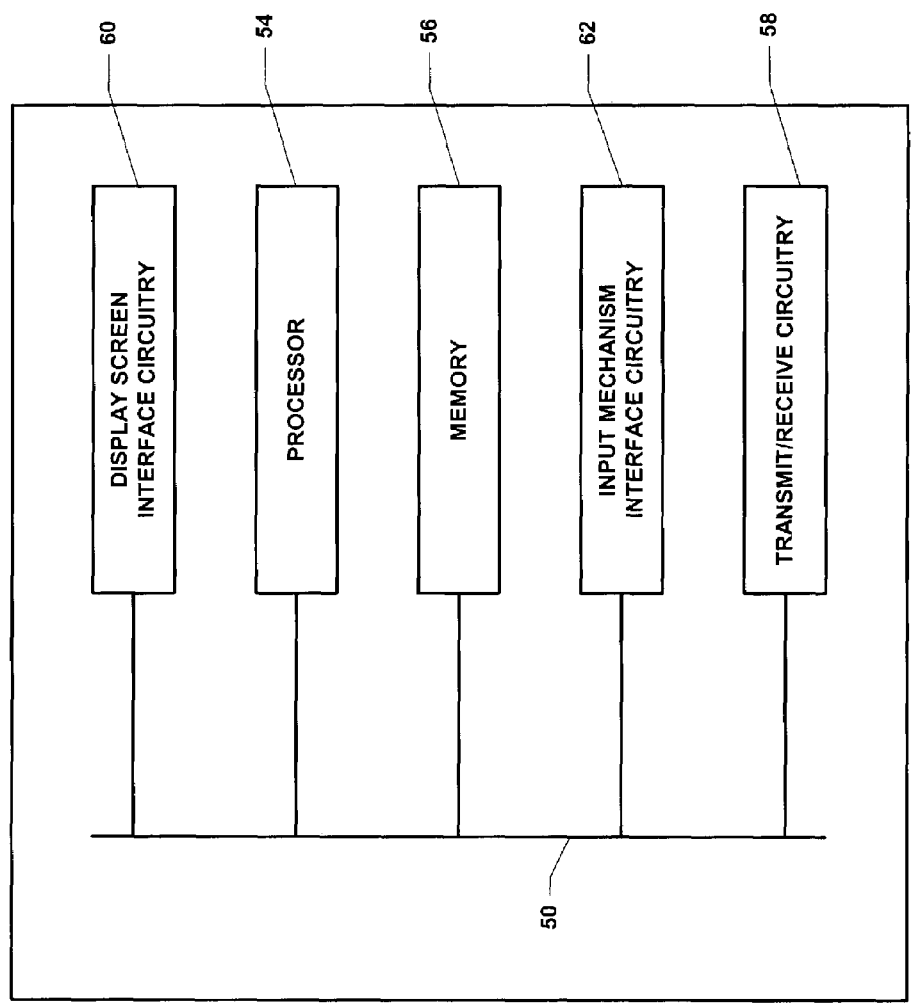
FIG. 2 illustrates an exemplary internal architecture of the wireless terminal.

FIG. 2 illustrates an exemplary internal architecture of the wireless terminal 12. The client terminal 12 may have a bus 50 that couples together a processor 54, memory 56, transmit/receive circuitry 58, display screen interface circuitry 60, and input mechanism interface circuitry 62. Other circuitry or alternative circuitry, of course, may be coupled to the bus 50. In addition, some of the devices coupled to the bus, for example, the processor 54 and the memory 56, may be combined.

The processor 54 may execute computer instructions defining one or more applications. The one or more applications may include, for example, a dial-up application, a calculator application, a calendar application, or a to-do application, that are commonly found on wireless terminals. It is well known, however, that the computer instructions can define many other applications.

The computer instructions that define the one or more applications may be stored in the memory 56. The memory 56 may be random access memory (RAM) or file storage for the computer instructions that define the one or more applications. Of course, the memory 56 may take many other forms and is in no way limited to RAM or file storage.

The transmit/receive circuitry 58, the display screen interface circuitry 60, and the input mechanism interface circuitry 62 may allow for coupling the communication port 14, the display screen 16, the input mechanism 24, the microphone 26, and the speaker 20, respectively, to the bus 50. The transmit/receive circuitry 58 may facilitate transmitting and receiving signals through the communication port 14. The display screen interface circuitry 60 may facilitate the display of text and graphics on the display screen 16. And the input mechanism circuitry 62 may allow for detecting actuation of the input mechanism, sending sound to the speaker 22, and receiving sound from the microphone 20.

Figure 3:
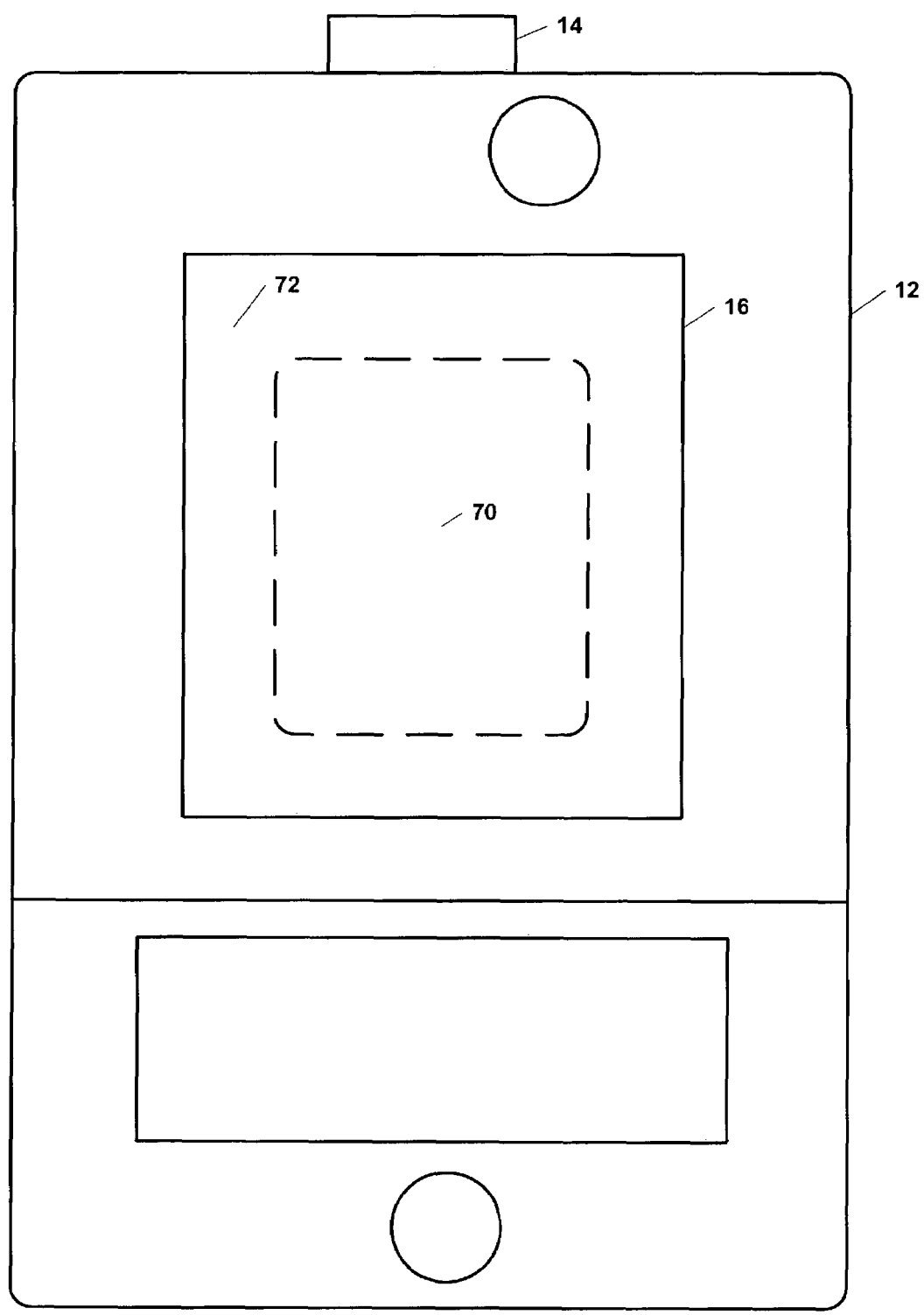
FIG. 3 illustrates division of the display screen of the wireless terminal into an edge area and a display area.

FIG. 3 illustrates that a viewable area of the display screen 16 may be divided into at least two regions. The viewable area may consist of an application area 70. The application area 70 may be a region of the display screen 16 where the wireless terminal 12 displays text and/or graphics. The viewable area may also consist of an edge area 72. The edge area 72 may be a region of the display screen 16 along the at least one edge of the display screen 16. The edge area 72 may also display text and/or graphics of a particular form to be described herein.

While FIG. 3 illustrates the edge area 72 being on all four sides of the display screen 16, the edge area 72 could also be on one side, two sides, three sides, or a portion of one or more sides of the display screen 16.

In accordance with an exemplary embodiment of the present invention, the wireless terminal 12 may present a graphical representation of telephone keys within the edge area 72 of the display screen 16. The graphical representation of telephone keys may replicate functionality of a full-size telephone keypad, but without its space requirements. By presenting the graphical representation of telephone keys within the edge area 72, the graphical representation of telephone keys will not obscure the text and graphics associated with the application running prior to execution of the dial-up application. This allows simultaneous display of text and/or graphics associated with an application and the telephone keys. By way of just one example, the simultaneous display could be useful when a user dials a telephone number provided by the prior application. In this case, the user could view the telephone number being displayed as he selects the telephone keys defined by the graphical representation.

Figure 4:
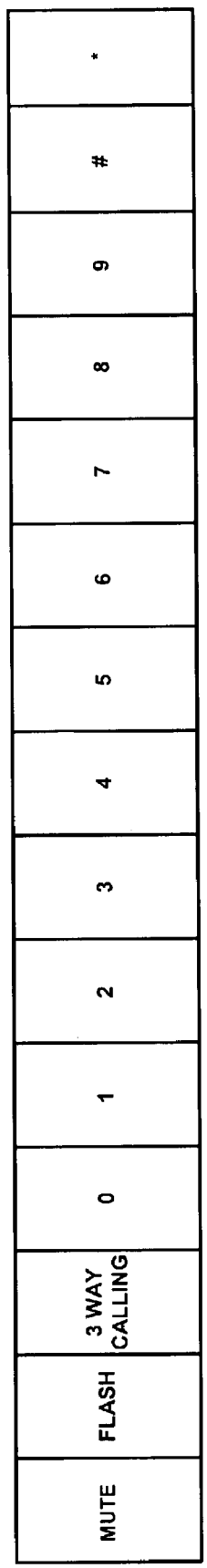
FIG. 4 illustrates an exemplary graphical representation of telephone keys.

FIG. 4 illustrates an exemplary embodiment of the graphical representation of telephone keys. The graphical representation of telephone keys 76 may include dialing keys and function keys. The dialing keys may be keys, e.g., numeric digits 0-9 and symbols * and #, that can be used to establish a connection with the remote terminal. For example, the dialing key may allow the user to dial a telephone number addressing the remote terminal. On the other hand, the function keys, e.g., 3-way calling, flash, and mute commonly found on telephones, may be used to perform various functions when the connection with the remote terminal is established.

The wireless terminal may serially present, e.g., adjacent to each other, the telephone keys within the edge area 72. However, the telephone keys need not be touching each other. Additionally, the graphical representation of telephone keys may be segmented as one or more separate graphical representations, rather than a single series of telephone keys. Still additionally, the function keys may be presented with the dialing keys when a connection is being established. Alternatively, the function keys of the graphical representation may be presented with the dialing keys once the connection with the remote terminal is established.

While FIG. 4 shows one of many ways to represent the telephone keys, many other ways are also available. For example, the number could include corresponding letters, like ABC on the "2" key. Also, the telephone keys could be in a wide variety of shapes, colors, and/or shadings. The function keys may also take a variety of forms and include many other functions, such as "speed dial" keys.

Figure 5A:
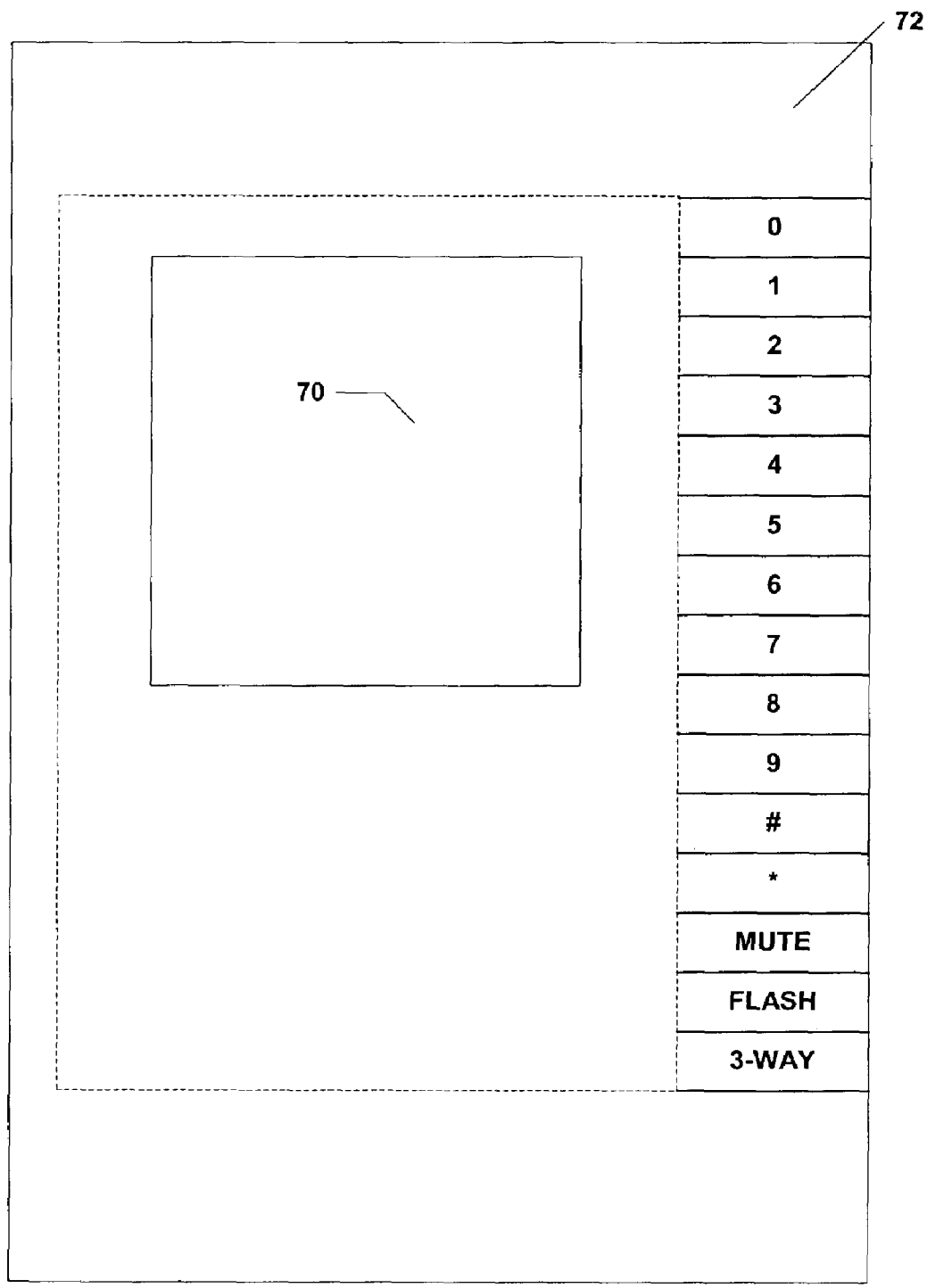
FIGS. 5(*a*) and 5(*b*) illustrate presenting the graphical representation of telephone keys within the edge area of the display screen.
Figure 5B:
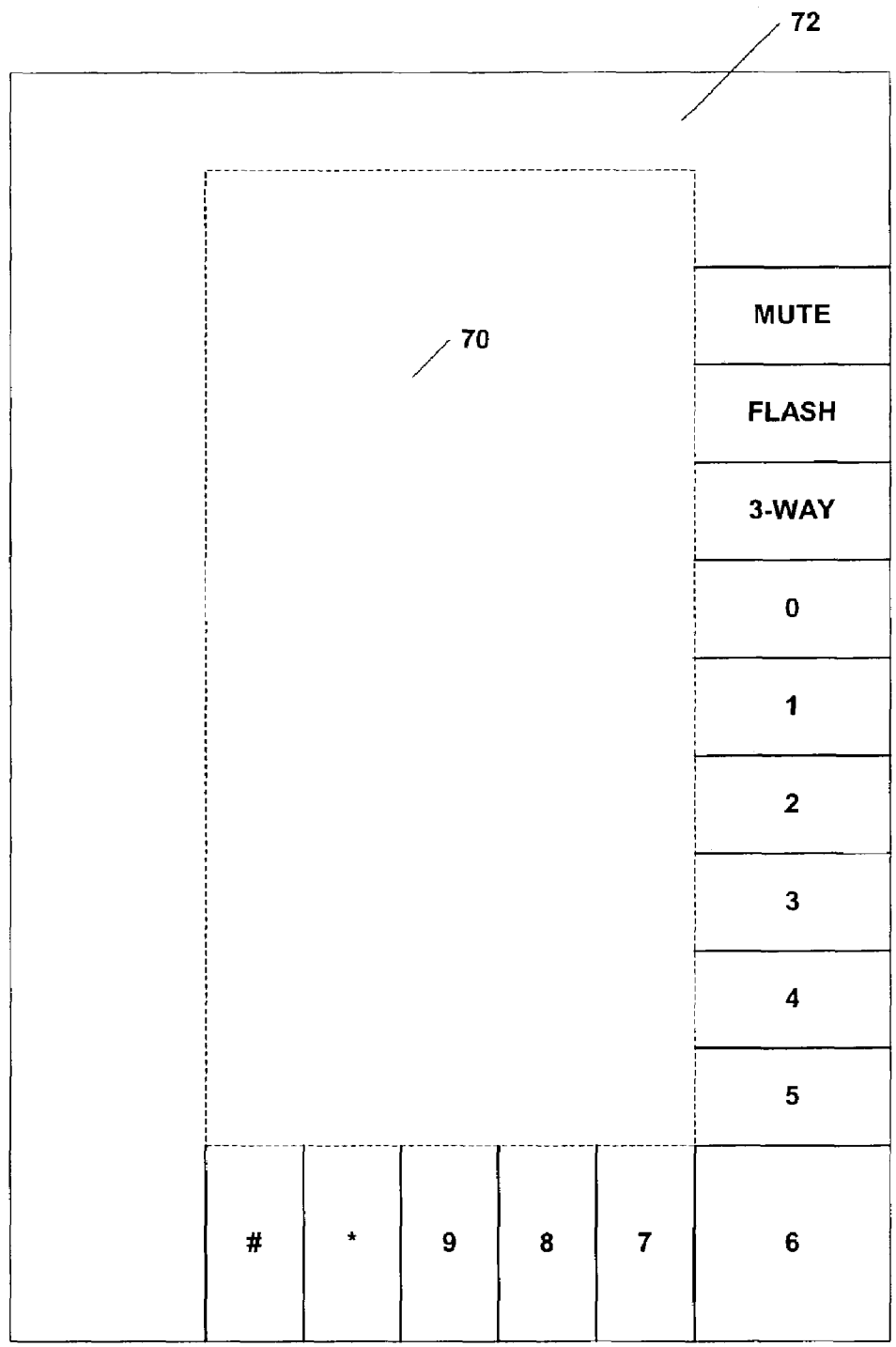

FIGS. 5(*a*) and 5(*b*) illustrates exemplary positioning of the graphical representation of telephone keys within the edge area 72 of the display screen 16. The graphical representation of telephone keys may be positioned anywhere within the edge area 72 of the display screen 16. The graphical representation of telephone keys may be positioned along one edge of the display screen, as shown by FIG. 5(*a*). Alternatively, the graphical representation of telephone keys may be positioned along more than one edge of the display screen, as shown by FIG. 5(*b*).

Other arrangements are also possible for the presentation of the graphical representation of telephone keys. As noted above, the telephone keys need not touch each other. Additionally, the telephone keys may be spread out around three or more edges. Still additionally, the telephone keys may be oriented as a curve or a diagonal when, for example, at least one edge of the display screen is not defined by a vertical or a horizontal edge.

The wireless terminal 12 may also detect that a user has selected a given telephone key defining the graphical representation. The manner in which the wireless terminal 12 detects the selection of the given telephone key may depend on the type of input mechanism.

If the input mechanism is a touch-sensitive display, then the user may touch all or a portion of the given telephone key presented on the display screen. The wireless terminal may detect the touch of the display screen and thus learn the given telephone key selected by the user.

Alternatively, if the input mechanism is a pointing device, then the user may move a pointer to point to all or a portion of the given telephone key presented on the display screen 16. Then, the user may actuate the key 28. The wireless terminal 12 may detect actuation of the key 28 and thus learn the given telephone key selected by the user. The given telephone key selected may be that pointed to by the pointer.

Still alternatively, if the input mechanism 24 uses arrow keys, then the user may actuate one or more of the arrow keys. The arrow keys may scroll a highlight from one telephone dialing key to another in the graphical representation. The user may actuate the arrow keys until all or a portion of the given telephone dialing key is highlighted. Then, the user may actuate the key 28. The wireless terminal 12 may detect actuation of the key 28 and thus learn the given telephone key selected by the user. The given telephone key selected may be that highlighted in the graphical representation Other arrangements are also possible for indicating selection of the particular telephone key in the graphical representation. All such modifications and equivalents which fall within the spirit and scope of the exemplary embodiments of the present invention are included herein.

Figure 6:
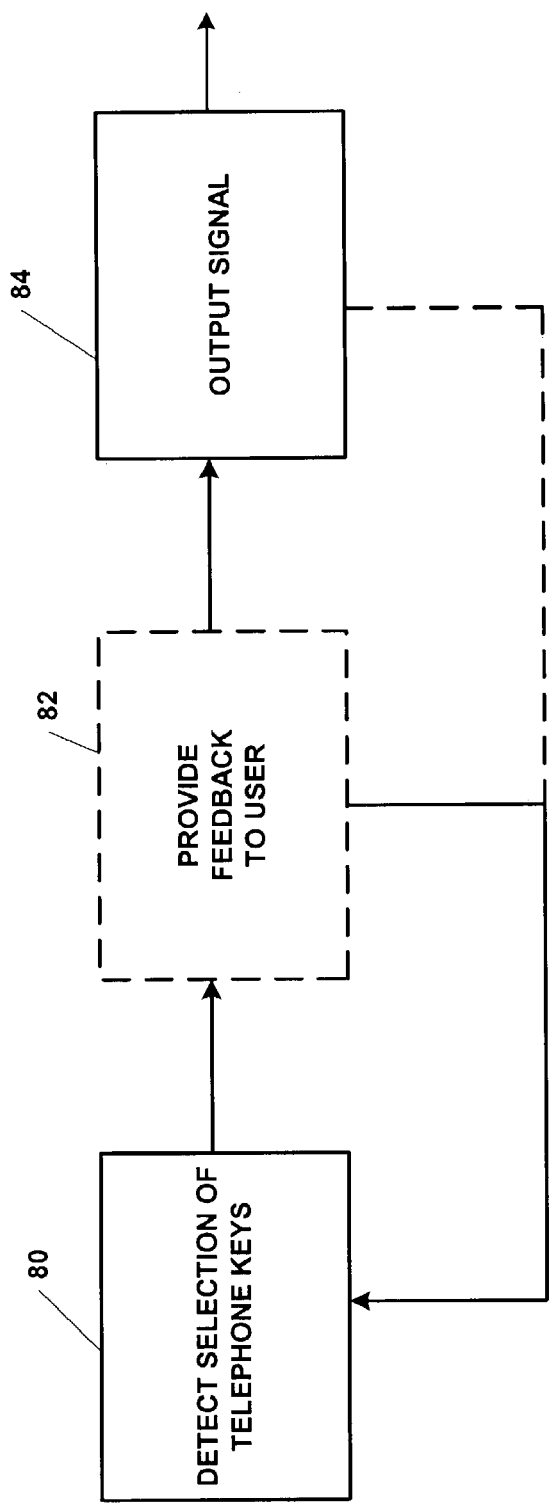
FIG. 6 is a flow chart that illustrates processing by the wireless terminal as a result of one of the telephone keys being selected.

FIG. 6 is an exemplary flow chart illustrating the processing performed by the wireless terminal 12 as a result of the wireless terminal presenting the graphical representation of telephone keys on the display screen 16.

Processing performed by the wireless terminal 12 may begin at step 80. At step 80, the input mechanism circuitry 62 may detect that the user indicated selection of a particular telephone key. Optionally, at step 82, the wireless terminal may provide feedback to the user that the particular telephone key was selected. The feedback may take the form of presenting somewhere on the display screen 16 a numeric digit or a symbol corresponding to the particular key selected. Alternatively, the feedback may take the form of the particular telephone key selected being highlighted within the graphical representation. Other arrangements are also possible.

Steps 80 and 82 may be repeated as one or more telephone keys are selected. After a predefined number of telephone keys have been selected, the transmit/receive circuitry 58 may output a signal at step 84.

The signal may be take the form of those described in Introduction to cdma2000 Standards for Spread Spectrum Systems PN-4427 (TIA/EIA/IS-2000) July 1999, herein incorporated by reference in its entirety. The signal may take the form of DTMF tones that define a number or a symbol associated with the one or more telephone keys selected. Alternatively, the signal may take the form of a data stream that defines a number or a symbol associated with the one or more telephone key selected.

The wireless network may receive signals and identify the remote terminal to which a connection is to be established.

Alternatively, the signals may indicate to the wireless network that a particular function is to be performed. The function may be to, for example, access voice mail, delete a voice mail, save a voice mail, or connect to another remote terminal. Other variations are also possible.

Of course, the signal may take other forms in addition to, or instead of, the DTMF tones or the data streams. The DTMF tones and the data stream are merely used here as one example of many other forms that the signal can take.

As noted above, the telephone keys may include function keys. In addition to the mute key, flash key, and three-way calling key, one of the function keys may be a "maximize key" 88. The maximize key 88 may allow the wireless terminal 12 to present a full sized telephone dialing keypad on the wireless terminal 12. The user may indicate selection of the maximize key 88 like any of the other keys of the graphical representation of telephone keys. In response to the maximize key 88 being selected, the processor 54 may signal the display interface circuitry 60 to present the full-sized telephone dialing keypad.

FIG. 7 illustrates results of the wireless terminal 12 detecting selection of the maximize key 88. The wireless terminal 12 may present a full size telephone dialing keypad 90 in the display screen 16. The full-size telephone dialing keypad 90 may have a full-size version of the telephone keys in the graphical representation of telephone keys. Additionally, there may be a "minimize key" 92 presented on the display screen 16. The minimize key 92 may allow for shrinking the full-size telephone dialing keypad to the graphical representation of telephone keys illustrated by, for example, FIGS. 5(*a*) and 5(*b*). The full-size telephone dialing keypad 90 may still other keys in addition to or instead of those described herein.

Exemplary embodiments of the present invention have thus been illustrated and described. It will be understood, however, that changes and modifications may be made to the invention as described without deviating from the spirit and scope of the invention, as defined by the following claims.

I claim:

1. A method comprising:
   presenting on a display screen of a wireless terminal a graphical representation of telephone keys serially along at least one edge of the display screen, wherein each telephone key is located on the display screen along one of the edges of the display screen, and wherein the graphical representation is selectable by a user;
   detecting user-selection of a portion of the graphical representation, the portion of the graphical representation corresponding to a given one of the telephone keys; and
   outputting a signal that defines the given one of the telephone keys.

2. The method of claim 1, wherein outputting the signal that defines the given one of the telephone keys comprises outputting a DTMF tone.

3. The method of claim 1, wherein outputting the signal that defines the given one of the telephone keys comprises outputting a data stream.

4. The method of claim 1, further comprising:
   presenting on the display screen a numeric representation of the given one of the telephone keys.

5. The method of claim 1, wherein presenting the graphical representation of telephone keys comprises presenting the graphical representation of telephone keys concurrently with application-specific information.

6. The method of claim 1, further comprising:
   detecting user-selection of a maximize key; and
   responsively presenting a graphical representation of a full telephone keypad on the display screen.

7. The method of claim 1, wherein the telephone keys comprise dialing keys that represent numeric digits 0 to 9.

8. The method of claim 1, wherein the telephone keys comprise function keys selected from the group consisting of mute, flash, and 3-way calling.

9. The method of claim 8, wherein presenting the graphical representation of telephone keys serially along the at least one edge of the display screen of the wireless terminal comprises presenting the function keys in response to a connection with a remote terminal being established.

10. A wireless handheld terminal comprising:
    a processor;
    a memory;
    a display screen defined by at least one edge;
    computer instructions stored in the memory and executable by the processor (i) to cause presentation on the display screen of a graphical representation of telephone keys serially along the at least one edge of the display screen, wherein each telephone key is located on the display screen along one of the edges of the display screen, and wherein the graphical representation is selectable by a user, (ii) to detect that a portion of the graphical representation has been selected, the portion corresponding to a given one of the telephone keys, and (iii) to output a signal that defines the given one of the telephone keys.

11. The wireless handheld terminal of claim 10, wherein the computer instructions stored in the memory and executable by the processor further comprise computer instructions to cause the graphical representation of telephone keys to be presented concurrently with application-specific information.

12. The wireless handheld terminal of claim 10, wherein the telephone keys comprise dialing keys that represent numeric digits 0 to 9.

13. The wireless handheld terminal of claim 10, wherein the signal is a DTMF tone.

14. The wireless handheld terminal of claim 10, wherein the signal is a data stream.

15. The wireless handheld terminal of claim 10, further comprising computer instructions stored in the memory and executable by the processor to perform the functions of:
    detecting that a maximize key has been selected; and
    responsively causing a graphical representation of a full telephone keypad to be presented on the display screen.

16. The wireless handheld terminal of claim 10, further comprising computer instructions stored in the memory and executable by the processor to perform the function of:
    causing a numeric representation of the given one of the telephone keys to be presented on the display screen, responsive to detecting that a portion of the graphical representation has been selected.

17. The wireless handheld terminal of claim 10, wherein the telephone keys comprise function keys selected from the group consisting of mute, flash, and 3-way calling.

18. The wireless handheld terminal of claim 10, wherein the computer instructions executable by the processor to cause presentation of the graphical representation of telephone keys serially along the at least one edge of the display screen of the wireless terminal comprises computer instructions executable by the processor to cause presentation of the function keys in response to a connection with a remote terminal being established.

19. A display screen of a wireless terminal comprising:
an edge portion of the display screen for displaying a graphical representation of telephone keys on the display screen, wherein each telephone key is located on the display screen serially along one of the edges of the display screen, and wherein the graphical representation is selectable by a user; and
a display portion of the display screen for displaying content associated with an application running on the wireless terminal prior to the graphical representation of telephone keys being displayed; and
wherein the display screen includes a means for detecting that a portion of the graphical representation has been selected, the portion corresponding to a given one of the telephone keys.

\* \* \* \* \*